United States Patent Office 2,783,757
Patented Mar. 5, 1957

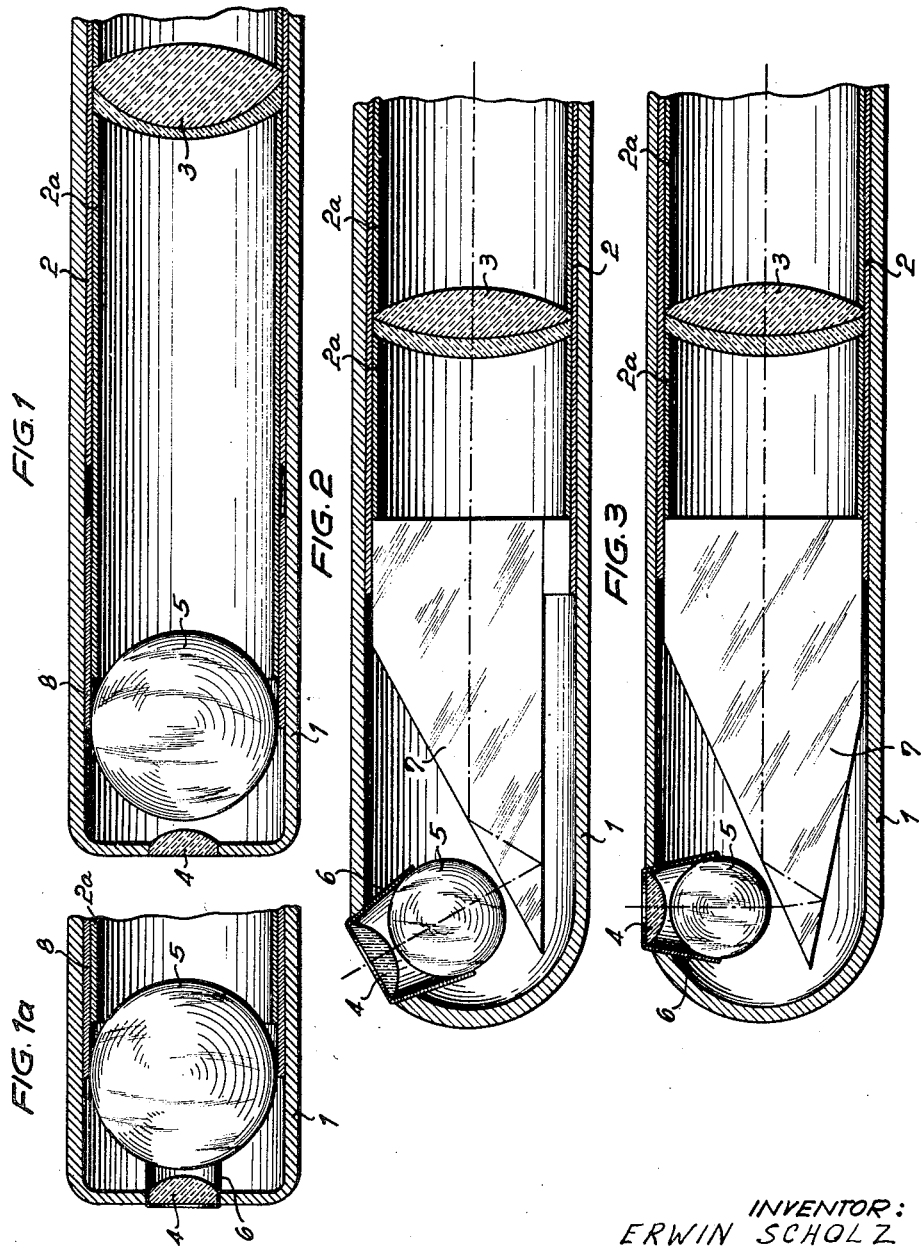

2,783,757

ENDOSCOPE FOR THE OBSERVATION OF VENTRICLES OF THE BODY OR THE LIKE

Erwin Scholz, Knittlingen, Wurttemberg, Germany, assignor to Richard Wolf, Knittlingen, Wurttemberg, Germany Application August 1, 1955, Serial No. 525,728

Claims priority, application Germany October 21, 1954

5 Claims. (Cl. 128—4)

The present invention relates to optics for endoscopes for the observation and examination of ventricles of the body, narrow bores in work-pieces and the like.

In endoscope-optics of the known type the image angle of the optics is very much limited by the use of the customary objective lenses. It has, therefore, already been proposed to employ as objective for the optics a ball-objective, having the center ray of the optic system pass through its center, and whose diameter is either equal to, smaller than or larger than the diameter of the optic tube, in order to obtain in this way by means of the optics an enlargement of the image field to be viewed and examined.

Compared with the optics already known to the art, the endoscope-optics of the invention are characterized by the feature that directly behind the customary plano-convex objective lens a ball-lens is arranged as back-lens, which ball-lens faces the inner convex surface of the objective lens and which has the center ray of the optic system pass through its center.

Through this arrangement of the ball-lens as back-lens directly behind the objective of short focal distance is obtained an image angle up to 180 degrees, so that the observer is enabled to examine with only one optic system a very large image field. Whereby it makes no difference, if the optic system is devised for a direction of observation of 180 degrees, in which case the diameter of the ball-lens is preferably equal to the diameter of the other lenses of the optic system in order to retain the luminous intensity of known optics, or if the optic system is devised for a pro-rectilinear—or 90° direction of observation, in which case the ball-diameter necessarily has to be smaller in order to provide, without troublesome enlargement of the forward end of the optic system, the required space for the accommodation of the deflection prism or reflecting surfaces by means of which the center ray entering through the ball-shaped back-lens is reflected into the axis of the optics. The herein disclosed arrangement of the ball-lens as back-lens directly behind the objective has the special advantage that the image appears before the observer flat, and not convexly curved as in the optics with large image angle (ball-objective) hereinbefore described. The so-called marginal loss occurring in optics of known construction is thereby avoided. This advantage produces particularly favorable results in photo-endoscopes, for which until now a comparatively small image angle had to be selected, that is to say, an image angle smaller than for ordinary endoscope optics (without ball-objective), as the marginal loss caused by the photographing resulted in photographs which lacked the necessary clearness, and for that reason were unsuited for use.

The invention will be best understood from a consideration of the following detailed description taken in connection with the accompanying drawings, forming a part of this specification and in which several embodiments of the invention have been shown by way of example. However, I wish to say that the invention is not confined to any strict conformity with the showing of the drawings, but may be changed or modified, so long as such changes or modifications mark no material departure from the salient features of the invention as expressed in the appending claims.

In the drawings, in which like parts have been referred to by the same reference numerals in all of the several figures, Fig. 1 is a longitudinal fractional view, partly in section, of the optics of the invention devised for a direction of observation of 180 degrees;

Fig. 1a is a longitudinal fractional view, partly in section, of a slightly modified form of construction, as compared with the construction of Fig. 1;

Fig. 2 is a longitudinal fractional view, partly in section, of the optics of the invention devised for a pro-rectilinear direction of observation;

Fig. 3 is a longitudinal fractional view, partly in section, of the optics of the invention devised for a direction of observation of 90 degrees.

Referring now to the drawings in detail, the reference numeral 1 designates the cover tube of the optics in which the system tube 2 is positioned. Arranged within the system tube 2 are the lenses of the optic system, whereby the several lenses are preferably secured in properly spaced relation with respect to each other by means of intermediate tubes 2a. The optic system proper terminates at the achromatic lens 3. At the free forward end of the optics, an objective 4 is arranged in the wall of the cover tube 1, whereby in the several forms of construction illustrated in the drawings the objective 4 is arranged with its axis in a special position, depending upon the desired direction of observation, with respect to the axis of the optics. The objective 4 is a customary plano-convex lens of short focal distance having its flat surface face the object to be viewed.

According to the invention, a ball-lens 5 is arranged as back-lens directly behind the objective 4 without being in contact with the latter, whereby the center ray of the optic system passes through the center of the ball-lens 5, so that by means of this system an enlargement of the image field up to approximately 180 degrees is obtained.

In the forms of construction of Figs. 1 and 1a with a direction of observation of 180 degrees, the ball-shaped back-lens 5 is shiftably and adjustably arranged in a sleeve 8 at the forward end of the system tube 2. And in order to avoid injuries of the confronting convex surfaces of the objective 4 and the ball-lens 5, through contact with each other when the optic system is introduced into the cover tube 1, the mounting 6 of the objective 4 may be lengthened in the direction toward the back-lens 5, so that the back-lens 5, when the optic system is introduced into the cover tube, comes to rest against the rim of the mounting 6. The distance of the ball-lens 5 from the objective 4 depends upon the diameter of the optics, and amounts to about $\frac{1}{10}$ mm. in customary cross-sections of observation optics. The radius of the ball-lens 5 and the radius of the convex surface of the objective 4 likewise depend upon the diameter of the optics, as tests have shown that only when these values are selected at a certain ratio with respect to each other the large image angle of approximately 180 degrees can be obtained without marginal loss, whereby the radius of the convex surface of the objective has to be kept as short as possible.

In the forms of construction of Figs. 2 and 3 with pro-rectilinear—and 90° direction of observation, the ball-lens 5 and the objective 4 are supported in the wall of the cover tube by means of a common mounting 6. In these constructions the diameter of the ball-lens 5 is very much smaller than that of the ball-lens of Figs. 1 and 1a in order to provide space for the accommodation of the deflection prism 7 needed in order to reflect the ray entering through the objective 4 into the axis of the optics. In the optics of Figs. 2 and 3 the arrangement of the ball-lens and objective in a common mounting is advisable for assembling reasons. But also here it is necessary to arrange the two lenses as closely together as possible, but without contact with each other.

What I claim as new and desire to secure by Letters Patent of the United States is:

1. In an endoscope for the observation of ventricles of the body or the like, an optic tube; a plano-convex objective lens mounted in the wall of said optic tube at the observation end of the latter with its convex surface portion inwardly turned; a ball-lens arranged as back-lens directly behind said plano-convex objective lens within said optic tube; and an optic system positioned within said optic tube and so devised and arranged that the center ray of said optic system passes through the center of said ball-lens.

2. In an endoscope for the observation of ventricles of the body or the like, an optic tube; a plano-convex objective lens of short focal distance mounted in the wall of said optic tube at the observation end of the latter with its convex surface portion inwardly turned; a ball-lens arranged within said optic tube as back-lens as closely as possible behind said convex surface portion of said plano-convex objective lens but at slight distance from the latter so that contact is avoided; and an optic system positioned within said optic tube and so devised and arranged that the center ray of said optic system passes through the center of said ball-lens.

3. An endoscope as specified in claim 2, including a casing in which said plano-convex objective lens and said ball-lens are secured in proper position with respect to each other and by means of which they are mounted in the wall of said optic tube for a pro-rectilinear direction of observation; and in which said optic system includes a deflection prism and is devised and arranged for a pro-rectilinear direction of observation via said deflection prism, ball-lens and plano-convex objective lens.

4. An endoscope as specified in claim 2, including a casing in which said plano-convex objective lens and said ball-lens are secured in proper position with respect to each other and by means of which they are mounted in the wall of said optic tube for a 90° direction of observation; and in which said optic system includes a deflection prism and is devised and arranged for a 90° direction of observation via said deflection prism, ball-lens and plano-convex objective lens.

5. An endoscope as specified in claim 2, in which said optic system is devised and arranged for a 180° direction of observation via said ball-lens and said plano-convex objective lens; and in which said ball-lens is shiftably and adjustably arranged at the forward end of said optic system.

References Cited in the file of this patent

UNITED STATES PATENTS

| | | |
|---|---|---|
| 1,001,786 | Wappler | Aug. 29, 1911 |
| 1,881,588 | Horni | Oct. 11, 1932 |